United States Patent
Hirano et al.

(10) Patent No.: US 8,753,754 B2
(45) Date of Patent: Jun. 17, 2014

(54) STEEL SHEET FOR CAN EXHIBITING EXCELLENT CORROSION RESISTANCE

(75) Inventors: Shigeru Hirano, Tokyo (JP); Makoto Kawabata, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 13/816,914

(22) PCT Filed: Aug. 15, 2011

(86) PCT No.: PCT/JP2011/068510
§ 371 (c)(1),
(2), (4) Date: Feb. 13, 2013

(87) PCT Pub. No.: WO2012/023536
PCT Pub. Date: Feb. 23, 2012

(65) Prior Publication Data
US 2013/0143066 A1 Jun. 6, 2013

(30) Foreign Application Priority Data
Aug. 18, 2010 (JP) ................. 2010-182661

(51) Int. Cl.
| | |
|---|---|
| *C25D 3/12* | (2006.01) |
| *C25D 9/10* | (2006.01) |
| *C25D 11/38* | (2006.01) |
| *B32B 15/04* | (2006.01) |
| *B32B 15/18* | (2006.01) |
| *C23C 28/00* | (2006.01) |
| *C23C 22/24* | (2006.01) |
| *B65D 85/00* | (2006.01) |

(52) U.S. Cl.
CPC .. *C25D 3/12* (2013.01); *C25D 9/10* (2013.01); *C25D 11/38* (2013.01); *B32B 15/04* (2013.01); *B32B 15/18* (2013.01); *C23C 28/3455* (2013.01); *C23C 22/24* (2013.01); *B65D 85/00* (2013.01)
USPC ........................................... 428/632; 428/679

(58) Field of Classification Search
None
See application file for complete search history.

(56) References Cited

U.S. PATENT DOCUMENTS 4,501,802 A * 2/1985 Higuchi et al. ............... 428/629
6,291,083 B1 * 9/2001 Wada ........................... 428/632

(Continued)

FOREIGN PATENT DOCUMENTS

CN 101466872 A 6/2009
GB 2 079 319 A 1/1982

(Continued)

OTHER PUBLICATIONS

Abstract for JP 62-33794. Feb. 1987.*

(Continued)

*Primary Examiner* — John J Zimmerman
(74) *Attorney, Agent, or Firm* — Birch, Stewart, Kolasch & Birch, LLP

(57) ABSTRACT

The present invention provides a steel sheet for a can exhibiting excellent corrosion resistance, adhesive properties, and weldability, including a steel sheet, an Ni—Cu alloy plating layer formed on at least one surface of the steel sheet; and a chromate film layer formed on a surface of the Ni—Cu alloy plating layer, in which the Ni—Cu alloy plating layer has Ni attached thereto in an amount of from 0.30 g/m² to 3.0 g/m², and Cu contained therein in an amount of from 0.5 mass % to 20 mass %; and the chromate film layer has Cr attached thereto in an amount of from 1.0 mg/m² to 40 mg/m² in equivalent units of Cr.

2 Claims, 2 Drawing Sheets

(56) References Cited

U.S. PATENT DOCUMENTS

| | | | | |
|---|---|---|---|---|
| 2011/0259756 A1* | 10/2011 | Hirano et al. | ............... | 205/320 |
| 2012/0183753 A1* | 7/2012 | Hirano et al. | ............... | 428/212 |

FOREIGN PATENT DOCUMENTS

| JP | 56-169788 A | | 12/1981 |
|---|---|---|---|
| JP | 60-145380 A | | 7/1985 |
| JP | 62-33794 A | | 2/1987 |
| JP | 11-61377 | * | 3/1999 |
| JP | 11-106952 A | | 4/1999 |
| JP | 2000-26992 A | | 1/2000 |
| JP | 2998043 B2 | | 1/2000 |
| JP | 3060073 B2 | | 7/2000 |
| JP | 2000-263696 A | | 9/2000 |
| JP | 2000-334886 A | | 12/2000 |
| JP | 2005-149735 A | | 6/2005 |
| JP | 2007-231394 A | | 9/2007 |
| JP | 2010-13728 A | | 1/2010 |
| WO | WO 91/12359 | * | 8/1991 |

OTHER PUBLICATIONS

Machine translation of JP 11-106952. Apr. 1999.*
Machine translation of JP 2010-013728. Jan. 2010.*
Translation of JP 62-033794. Feb. 1987.*
International Search Report, issued in PCT/JP2011/068510, dated Sep. 6, 2011.
Office Action for Chinese Application No. 201180039022.3, dated Sep. 30, 2013, including an English translation.
"Corrosion Resistance of Nickel-Containing Alloys in Organic Acids and Related Compounds", Corrosion Engineering Bulletin: CEB, International Nickel Company, US, vol. 6, Jan. 1, 1979, pp. 1-64, XP009116451.
European Search Report dated Feb. 13, 2014 for European Patent Application No. EP 11 81 8177.5.

* cited by examiner

STEEL SHEET FOR CAN EXHIBITING EXCELLENT CORROSION RESISTANCE

TECHNICAL FIELD

The present invention relates to a steel sheet for a can, and in particular, to a steel sheet used for a two-piece can and a three-piece can and exhibiting excellent corrosion resistance, adhesive property, and weldability.

The present application claims priority based on Japanese Patent Application No. 2010-182661 filed in Japan on Aug. 18, 2010, the disclosures of which are incorporated herein by reference in their entirety.

BACKGROUND ART

Steel containers used in the beverage-can field can be broadly divided into a two-piece can and a three-piece can. The two-piece can is typified by a DrD can and a DI can, and is formed integrally by a can bottom and a body portion of the can through drawing, ironing, or bending-and-bending-back, or a combination of these workings. Steel sheets used for these can bodies include a tin plate (Sn-plated steel sheet) and a tin-free steel sheet (TFS, steel sheet having electrolytic chromic-acid treatment applied thereto), and the selection of sheets used depends upon applications or working methods.

The three-piece can is a can having a body portion and a bottom portion, which are separately formed, and is typified by a welded can having the body portion manufactured through welding. As a base material for the body portion of the can, a steel sheet having thin Sn plating or a thin Ni-plated steel sheet is used. As a base material for the bottom portion, TFS or another material is used.

For both of the two-piece can and the three-piece can, printing is applied on the external surface of the can in order to let consumers recognize the commodity value of the product. Further, the inner surface of the can is coated with resin to secure the corrosion resistance. For the conventional two-piece can, after the formation of the can, the inner surface of the can is lacquered with spray, and curved surface printing is applied to the external surface of the can. Further, recently, there is proposed a laminated two-piece can obtained by shaping a steel sheet having a PET film laminated in advance into the can (Patent Document 1, Patent Document 2). For a conventional three-piece can, the welded cans have been manufactured by welding a steel sheet having a lacquered inner surface and a printed external surface. However, there is proposed a three-piece can manufactured by using a laminated steel sheet with a PET film having printing already applied thereto, instead of using a lacquering finish (Patent Document 3, Patent Document 4).

When the two-piece can is manufactured, the steel sheet for a can is subjected to drawing, ironing and bending-and-bending-back works. Further, when the three-piece can is manufactured, the steel sheet for a can is subjected to neck forming and flange forming, and in some cases, to expand forming for the purpose of design. Thus, a laminate steel sheet used for the steel sheet for a can is required to have an excellent film adhesive property in which these works and forming can be applied without causing any trouble.

Although having excellent corrosion resistance against acid contents resulting from its sacrificial-protection effect of Sn, Sn-plated steel sheets have the outermost layer formed by brittle Sn oxide, which results in unstable film-adhesive properties. This poses a problem in that the film detaches when the above works or forming are applied, or corrosion starts from a portion having insufficient adhesive force between the film and the steel sheet.

For these reasons, a weldable Ni-plated steel sheet having excellent workability and adhesive properties is used as the laminate steel sheet for a container (Patent Document 5). The Ni-plated steel sheet has been disclosed, for example, in Patent Document 9. Although, as with the case of the Sn-plated steel sheet, the Ni-plated steel sheet may have a non-gloss surface, there is known a Ni-plated steel sheet having bright plating applied thereto through Ni-plating with a brightening agent (Patent Document 6, Patent Document 7).

However, unlike Sn, Ni does not have a sacrificial-protection effect in the acid solution. Thus, it is known that, when highly corrosive subjects such as acid beverage are contained, there occurs pitting corrosion with which corrosion advances in the thickness direction from imperfect portions such as a pinhole in the Ni-plating layer, causing a through-hole within a short period of time. Under such circumstances, there is a demand for the Ni-plated steel sheet having improved corrosion resistance. Further, there is an invention relating to a Ni-plated steel sheet having steel components adjusted such that the electric potential of the steel sheet to be plated becomes nobler to reduce the pitting corrosion (Patent Document 8).

RELATED ART DOCUMENTS

Patent Documents

Patent Document 1: Japanese Unexamined Patent Application, First Publication No. 2000-263696
Patent Document 2: Japanese Unexamined Patent Application, First Publication No. 2000-334886
Patent Document 3: Japanese Patent No. 3060073
Patent Document 4: Japanese Patent No. 2998043
Patent Document 5: Japanese Unexamined Patent Application, First Publication No. 2007-231394
Patent Document 6: Japanese Unexamined Patent Application, First Publication No. 2000-26992
Patent Document 7: Japanese Unexamined Patent Application, First Publication No. 2005-149735
Patent Document 8: Japanese Unexamined Patent Application, First Publication No. S60-145380
Patent Document 9: Japanese Unexamined Patent Application, First Publication No. S56-169788

DISCLOSURE OF THE INVENTION

Problems to be Solved by the Invention

With the invention described in Patent Document 8 above, although it is possible to obtain an effect of reducing the pitting corrosion to some degree, there is a demand for a Ni-plated steel sheet having further improved corrosion resistance. Further, since the invention of Patent Document 8 limits the steel composition, this invention is applied only to limited applications. For these reasons, there is a demand for a Ni-plated steel sheet applicable to a broader range of contained substances and shapes of the can. The present invention has been made in view of the circumstances described above, and an objective of the present invention is to provide a steel sheet for a can having excellent corrosion resistance, adhesive properties, and weldability.

Means for Solving the Problems

The present invention employs the following means to achieve the above-described objectives.

(1) A first aspect of the present invention provides a steel sheet for a can exhibiting excellent corrosion resistance, adhesive properties, and weldability, including: a steel sheet; a Ni—Cu alloy plating layer formed on at least one surface of the steel sheet; and a chromate film layer formed on a surface of the Ni—Cu alloy plating layer, in which the Ni—Cu alloy plating layer has Ni attached thereto in the amount of from 0.30 g/m² to 3.0 g/m², and Cu contained therein in the amount of from 0.5 mass % to 20 mass %; and the chromate film layer has Cr attached thereto in the amount of from 1.0 mg/m² to 40 mg/m² in equivalent units of Cr.

(2) A second aspect of the present invention provides a steel sheet for a can exhibiting excellent corrosion resistance, adhesive properties, and weldability, including: a steel sheet; a Ni—Cu alloy plating layer formed on at least one surface of the steel sheet; and a Zr-containing film layer formed on a surface of the Ni—Cu alloy plating layer, in which the Ni—Cu alloy plating layer has Ni attached thereto in the amount of from 0.30 g/m² to 3.0 g/m², and Cu contained therein in the amount of from 0.5 mass % to 20 mass %, and the Zr-containing film layer has Zr attached thereto in the amount of from 1.0 mg/m² to 40 mg/m² in equivalent units of Zr.

Effects of the Invention

According to the present invention, it is possible to obtain a steel sheet for a can having excellent corrosion resistance and exhibiting adhesive properties to a laminated resin film, and weldability.

EMBODIMENTS OF THE INVENTION

Figure 1:
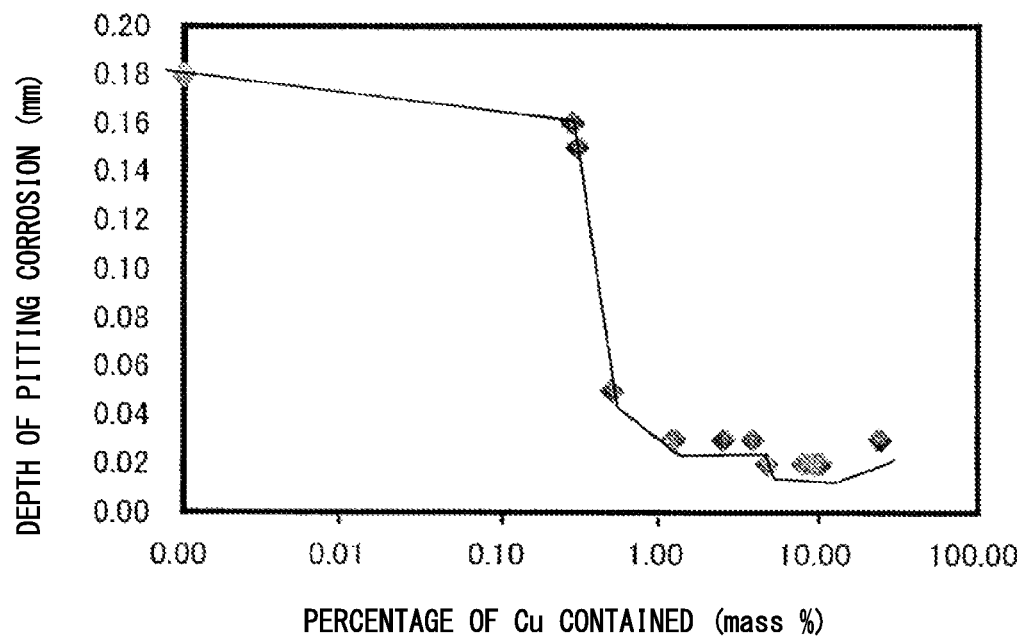
FIG. 1 is a graph showing a relationship between the percentage (mass %) of Cu contained in Ni plating and the depth of pitting corrosion.

The present inventors found that, by containing Cu in a Ni-plating layer to reduce the pitting corrosion, the pitting corrosion speed is reduced when corrosion advances from imperfect portions such as a pinhole in the Ni-plating layer (see FIG. 1).

This phenomenon is considered to occur through the following mechanism. It is supposed that a rate at which Cu elutes in the acid solution is high as compared with that of Ni, and thus, Cu is more likely to corrode; a similar effect occurs in the Ni-plating layer containing Cu; this results in a reduction in the electric potential difference between the Ni-plating layer and base iron, whereby the corrosion rate is reduced. The present inventors employed this phenomenon, and reached the present invention of the steel sheet for a can having excellent adhesive properties, corrosion resistance, and weldability.

Hereinbelow, a detailed description will be made of the steel sheet for a can according to an embodiment of the present invention based on the above-described findings and having excellent corrosion resistance, adhesive properties, and weldability.

Figure 2:
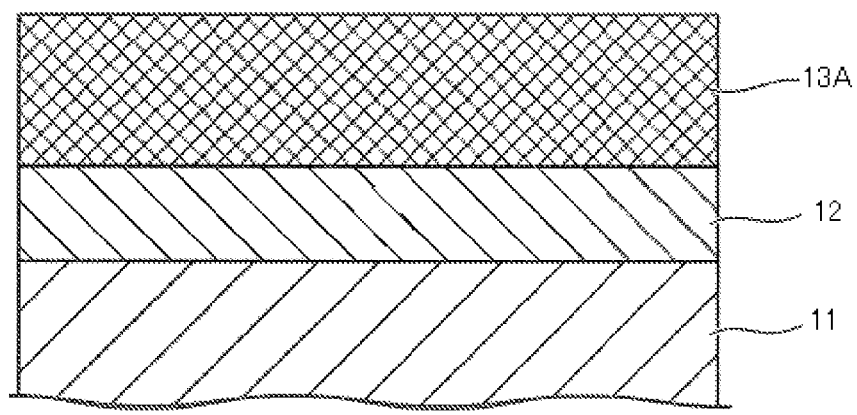
FIG. 2 is a schematic view illustrating an example of a structure of a steel sheet for a can according to an embodiment of the present invention.

As illustrated in FIG. 2, a steel sheet 1 for a can according to an embodiment of the present invention includes a steel sheet 11, a Ni—Cu alloy plating layer 12 formed on at least one surface of the steel sheet 11 and containing an amount of Ni attached in the range of 0.30 to 3.0 g/m² and an amount of Cu contained in the range of 0.5 to 20 mass %, and a chromate film layer 13A formed on a surface of the Ni—Cu alloy plating layer 12.

Figure 3:
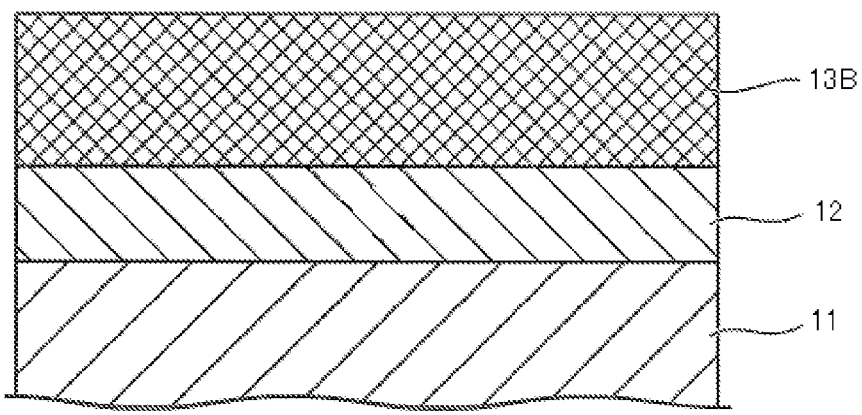
FIG. 3 is a schematic view illustrating another example of a structure of the steel sheet for a can according to an embodiment of the present invention.

It should be noted that, as illustrated in FIG. 3, in place of the chromate film layer 13A, a Zr-containing film layer 13B may be formed on the surface of the Ni—Cu alloy plating layer 12.

On the Ni—Cu alloy plating layer 12, the chromate film layer 13A is formed such that the amount attached is in the range of 1.0 to 40 mg/m² in equivalent units of Cr. Alternatively, on the Ni—Cu alloy plating layer 12, the Zr-containing film layer 13B is formed such that the amount of Zr attached is in the range of 1.0 to 40 mg/m².

The steel sheet 11 serves as a base sheet for the steel sheet 1 for a can to be plated, and may be manufactured through normal steel-strip manufacturing processes, hot rolling, acid washing, cold rolling, annealing, temper rolling or other process. The steel sheet 11 has a thickness of approximately in the range of 0.15 mm to 0.23 mm. The Ni—Cu alloy plating layer 12 is formed on the steel sheet 11 serving as the base sheet for plating in order to obtain the corrosion resistance, the adhesive properties, and the weldability. Ni is a metal having both the adhesive property to the steel sheet 11 and the forge-weldability (property for joining at temperatures less than or equal to the melting point). Thus, by attaching Ni of 0.30 g/m² or more when plating is applied to the steel sheet 11, it is possible to obtain the practical adhesive properties or weldability. With the amount of Ni attached of 0.40 g/m² or more, it is possible to obtain excellent adhesive properties or weldability. However, in the case where the amount of Ni attached exceeds 1.0 g/m², the adhesion strength of the attached portion starts to gradually decrease. Further, in the case where the amount exceeds 3.0 g/m², the adhesion strength of the attached portion starts to gradually decrease. In the case where the amount exceeds 3.0 g/m², the practical adhesion strength of the attached portion decreases, which leads to a reduction in the weldability. Thus, it is necessary to set the amount of Ni attached to be in the range of 0.30 to 3.0 g/m², preferably in the range of 0.40 to 1.0 g/m².

Further, the excessively low percentage of Cu contained in the Ni—Cu alloy plating layer 12 leads to an increase in the pitting corrosion, which is not preferable. In the case where the amount of Cu contained in the Ni—Cu alloy plating layer 12 reaches 0.5% or more, the pitting corrosion rate begins to be suppressed. On the other hand, the excessively high amount of Cu contained in the Ni—Cu alloy plating layer 12 inhibits the forge-weldability of Ni, which results in a deterioration in the weldability. Thus, it is necessary to set the amount of Cu contained in the Ni—Cu alloy plating layer 12 to be 20% or less. Further, in addition to Cu, the Ni—Cu alloy plating layer 12 contains inevitable impurities.

It is industrially useful to form the Ni—Cu alloy plating layer 12 on the steel sheet 11 in a manner such that cathode electrolysis is applied using plating bath with a solution having copper sulfate or copper chloride dissolved in a known acid nickel-plating solution including nickel sulfate or nickel chloride. However, the method for forming the Ni—Cu alloy plating layer 12 on the steel sheet 11 is not limited to this.

A chromate treatment is applied on to the Ni—Cu alloy plating layer 12 in order to enhance the corrosion resistance, the adhesive property with the resin film, and in particular, the secondary adhesive property after working. The chromate treatment forms the chromate film layer 13A formed by hydrated Cr oxide, or formed by hydrated Cr oxide and metal Cr.

The metal Cr or hydrated Cr oxide constituting the chromate film layer 13A exhibits excellent chemical stability, improving the corrosion resistance of the steel sheet 1 for a can in proportion to the amount of chromate film. Further, the hydrated Cr oxide forms strong chemical bonding with the functional group of the resin film, thereby providing excellent adhesive property even in the superheated steam environment. Thus, with the increase in the amount of chromate film layer 13A attached, the adhesive property to the resin film improves. In order to obtain practically sufficient corrosion resistance and adhesive property, it is necessary that the chromate film layer 13A is 1.0 mg/m$^2$ or more in equivalent units of metal Cr.

With the increase in the amount of the chromate film layer 13A attached, the corrosion resistance and the adhesive property further improve. However, the hydrated Cr oxide in the chromate film layer 13A is an electrical insulator. Thus, with the increase in the chromate film layer 13A attached, the electric resistance of the steel sheet 1 for a can significantly increases, which may lead to a deterioration in the weldability. More specifically, in the case where the amount of chromate film layer 13A attached exceeds 40 mg/m$^2$ in terms of the amount of metal Cr, the weldability significantly deteriorates. Thus, it is necessary to set the amount of the chromate film layer 13A attached in terms of metal Cr to be not more than 40 mg/m$^2$.

The chromate treatment may be performed through an immersion process, spray process, electrolysis treatment or other processes using aqueous solution of chromic acid with sodium salt, potassium salt, and ammonium salt. It is industrially excellent to employ a cathode electrolysis treatment in an aqueous solution obtained by adding sulfate ion or fluoride ion (including complex ion) or a combination thereof as plating assistant to chromic acid.

Further, in place of the chromate film layer 13A, the Zr-containing film layer 13B may be formed on the Ni—Cu alloy plating layer 12. The Zr-containing film layer 13B is a film made of a Zr compound such as Zr oxide, Zr phosphate, Zr hydroxide, and Zr fluoride, or a composite film made thereof. By forming the Zr-containing film layer 13B with the amount of 1.0 mg/m$^2$ or more in terms of the amount of metal Zr, it is possible to significantly improve the adhesive properties thereof to the resin film or corrosion resistance as is the case with the chromate film layer 13A described above. On the other hand, in the case where the amount of the Zr-containing film layer 13B attached exceeds 40 mg/m$^2$ in terms of metal Zr, the weldability and the cosmetic appearance deteriorate. In particular, the Zr film layer is an electrical insulator, and has a significantly high electric resistance, which may lead to a deterioration in the weldability. Thus, in the case where the amount of the Zr-containing film layer 13B attached in terms of the metal Zr exceeds 40 mg/m$^2$, the weldability significantly deteriorates. For these reasons, it is necessary that the amount of Zr film layer attached be set in the range of 1.0 to 40 mg/m$^2$ in terms of the amount of metal Zr.

The Zr-containing film layer 13B may be formed, for example, through an immersion process in which the steel sheet 11 having the Ni—Cu alloy plating layer 12 formed thereto is immersed into acid solution formed mainly by Zr fluoride, Zr phosphate, and hydrogen fluoride, or through a cathode electrolysis treatment.

According to this embodiment, it is possible to improve the resistance of the steel sheet 1 for a can against the pitting corrosion while enhancing the weldability, the adhesive properties to the resin film, and the adhesive property to the resin film after working.

EXAMPLES

Using Examples, the present invention will be described more in detail.

First, Examples according to the present invention and Comparative Examples will be described, and the results thereof will be shown in Table 1. Samples were manufactured through methods described in (1) below, and performance evaluation was made in terms of each item of (a) to (d) in (2) below.

(1) Method of Manufacturing Samples
Steel Sheet (Base Sheet to be Plated):

A cold-rolled steel sheet for a tin plate with a thickness of 0.2 mm and a temper grade of 3 (T-3) was used as the base sheet to be plated.

Conditions for Ni—Cu alloy plating: An aqueous solution having a pH=2 and containing nickel sulfate having a concentration of 20%, nickel chloride having a concentration of 15%, and boric acid of 1% was prepared; copper sulfate in the range of 1% to 10% was added to the aqueous solution; and cathode electrolysis with 5 A/dm$^2$ was performed, thereby forming the Ni—Cu alloy plating layer on the steel sheet. The amount of Ni attached to the steel sheet was controlled on the basis of the duration for which the electrolysis was applied.

Conditions for chromate treatment: An aqueous solution containing chromium oxide (VI) having a concentration of 10%, sulfuric acid having a concentration of 0.2%, and ammonium fluoride having a concentration of 0.1% was prepared; and cathode electrolysis with 10 A/dm$^2$ was performed in the aqueous solution; and water-washing was performed for 10 seconds, thereby forming the chromate film layer on the Ni-plating layer. The amount of Cr attached in the chromate film layer was controlled on the basis of the duration for which the electrolysis was applied.

Treatment Conditions for Zr-Containing Film Layer:

An aqueous solution containing zirconium fluoride having a concentration of 5%, phosphoric acid having a concentration of 4%, and hydrogen fluoride having a concentration of 5% was prepared; and cathode electrolysis with 10 A/dm$^2$ was performed in the aqueous solution, thereby forming Zr-containing film layer on the Ni-plating layer. The amount of Zr attached in the Zr-containing film layer was controlled on the basis of the duration for which the electrolysis was applied.

(2) Method of Evaluating Samples
(a) Weldability

Test pieces were laminated with a PET film having a thickness of 15 μm, and were subjected to welding with various electric currents under conditions in which an overlapped portion was 0.5 mm, applied pressure was 45 kgf, and a welding-wire speed was 80 m/min. The range of appropriate welding conditions was systematically determined on the basis of the degree of stability of welding and the width of the appropriate electric current range between the minimum electric current value at which sufficient welding strength can be obtained and the maximum electric current value at which welding defects such as spattering start to be apparent. Then, evaluation was made in four grades (A: Significantly wide, B: Wide, C: Practically acceptable, and D: Narrow).

(b) Adhesive Property

Test pieces were laminated with a PET film having a thickness of 15 μm, and were subjected to DrD press to manufacture cups. The cups were shaped into DI cans with a DI machine. Then, the shaped DI cans were observed in terms of detachment states of the film at a wall portion of the DI can, and the cans were evaluated and put into one of four grades or Zr-containing film layer attached is varied. In Table 1, underlines are applied to values that fall outside the range according to the present invention.

TABLE 1

| | | Ni—Cu alloy plating | | | | | | | |
|---|---|---|---|---|---|---|---|---|---|
| | Number | Amount of Ni attached (g/m²) | Percentage of Cu contained (%) | Chromate film (mg/m²) | Zr (mg/m²) | Weldability | Adhesive property | Secondary adhesive property | Corrosion resistance |
| Example | 1 | 2.8 | 9.2 | 1.2 | — | A-B | A | A-B | A |
| | 2 | 1.2 | 8.5 | 15 | — | A-B | A | A | A |
| | 3 | 0.8 | 0.6 | 4 | — | A | A | A | A |
| | 4 | 0.35 | 1.1 | 5 | — | A-B | A | A | A-B |
| | 5 | 0.6 | 3.8 | 38 | — | A | A | A | A |
| | 6 | 2.4 | 2.4 | 8 | — | A-B | A | A | A |
| | 7 | 1.8 | 12 | 22 | — | A-B | A | A | A |
| | 8 | 0.42 | 1.0 | — | 1 | A | A | A-B | A-B |
| | 9 | 0.8 | 2.2 | — | 12 | A | A | A | A |
| | 10 | 1.1 | 7.8 | — | 28 | A-B | A | A | A |
| | 11 | 2.4 | 19 | — | 37 | A-B | A | A | A |
| Comparative Example | 1 | <u>0.25</u> | 2.4 | 10 | — | C-D | B | B-C | C-D |
| | 2 | 1.3 | <u>0.3</u> | 21 | — | A-B | A | A | D |
| | 3 | 0.8 | <u>24</u> | 7 | — | D | A | A | A |
| | 4 | 2.5 | 4.4 | <u>0.7</u> | — | A-B | A | D | B |
| | 5 | 0.6 | 2 | <u>45</u> | — | D | A | A | A |
| | 6 | 1.5 | 4 | — | <u>0.6</u> | A-B | A | D | B |
| | 7 | 0.8 | 3.2 | — | <u>48</u> | D | A | A | A |
| | 8 | <u>3.2</u> | 7.8 | — | 2 | D | A | A | A |

(A: No detachment was found, B: Minor film-floating was found, C: Severe detachment was found, and D: Film detached during DI formation and body of can broke).

(c) Secondary Adhesive Property

Test pieces were laminated with a PET film having a thickness of 15 μm, and were subjected to DrD press to manufacture cups. The cups were shaped into DI cans with a DI machine; the DI cans were subjected to a thermal treatment at temperatures exceeding the melting point of the PET film (approximately 240° C.) for ten minutes, and then was processed (retort process) under a superheated steam atmosphere at 125° C. for 30 minutes. After the retort process, the DI cans were observed in terms of detachment states of the film at a wall portion of the can, and the cans were evaluated and put into one of four grades (A: No detachment was found, B: Minor film-floating was found, C: Severe detachment was found, and D: Film detached during DI formation and body of can broke).

(d) Corrosion Resistance

Welded cans having a PET film laminated thereto were manufactured. Repair paint was applied to a welded portion of each of the cans. The welded cans were filled with a test solution containing a combination of 1.5% citric acid-1.5% salt. The welded cans were lidded, and were left in a temperature-controlled room at 55° C. for one month. Then, by determining the corrosion states of a film damaged portion within the welded cans, the cans were evaluated and put into one of four grades (A: No pitting corrosion was found, B: Minor pitting corrosion was found but practically ignorable, C: Advanced pitting corrosion was found, D: Through-hole occurred due to pitting corrosion).

Table 1 shows results of evaluation on the weldability, the adhesive property, the secondary adhesive property and the corrosion resistance concerning Examples 1 to 11 and Comparative Examples 1 to 8 in which the amount of Ni attached and the percentage of Cu contained in the Ni—Cu alloy plating are varied and the amount of the chromate film layer or Zr-containing film layer attached is varied. In Table 1, underlines are applied to values that fall outside the range according to the present invention.

From Table 1, it can be understood that all the steel sheets according to Examples 1 to 11 exhibit excellent weldability, adhesive property, secondary adhesive property, and corrosion resistance.

Comparative Example 1 has a reduced amount of Ni attached in the Ni—Cu alloy plating layer, which results in a reduction, especially in weldability and corrosion resistance.

In Comparative Examples 2 and 3, the percentage of Cu contained in the Ni—Cu alloy plating layer falls outside the range of the present invention. This results in a reduction in corrosion resistance in Comparative Example 2, and a reduction in weldability in Comparative Example 3.

In Comparative Examples 4 and 5, the amount of the chromate film layer attached falls outside the range according to the present invention. This results in a reduction in the secondary adhesive property in Comparative Example 4, and a reduction in weldability in Comparative Example 5.

In Comparative Examples 6 and 7, the amount of the Zr-containing film layer attached falls outside the range according to the present invention. This results in a reduction in the secondary adhesive property in Comparative Example 6, and a reduction in weldability in Comparative Example 7.

Comparative Example 8 has increased amount of Ni attached in the Ni—Cu alloy plating layer, which results in a reduction in weldability.

Next, plural cold-rolled steel sheets for a tin plate with a thickness of 0.2 mm and a temper grade of 3 (T-3) were prepared as a base sheet for plating, and plating was applied to the cold-rolled steel sheets under Ni-plating conditions similar to those described above to form the Ni—Cu alloy plating layer on the steel sheet. The amount of Ni attached was set to 0.7 g/m² for all the prepared cold-rolled steel sheets.

Next, the chromate film layer was formed on the Ni—Cu alloy plating layer under chromate treatment conditions similar to those described above. The amount Cr attached in the chromate film layer was set to 8 g/m² for all the prepared samples.

The steel sheets prepared above were subjected to a corrosion resistance test in a manner similar to those described above, and a depth of the pitting corrosion was measured. The results of the measurement are shown in FIG. 1.

As shown in FIG. 1, in the case where the percentage of Cu contained in the Ni—Cu alloy plating layer falls within the range of 0.5% to 20%, the depth of the pitting corrosion falls within the range of 0.02 mm to 0.05 mm, which confirms that the corrosion resistance against the pitting corrosion significantly improves. In the case where the percentage of Cu contained falls within the range of 0.5% to 20%, corrosion advanced along the interface between the Ni—Cu alloy plating layer and the base iron. On the other hand, in the case where the percentage of Cu contained is less than 0.5%, corrosion advanced along the thickness direction of the steel sheet.

From Examples described above, the effects of the present invention can be confirmed.

Industrial Applicability

According to the present invention, it is possible to obtain a steel sheet for a can having excellent corrosion resistance, adhesive properties to the laminated resin film, and weldability.

| Reference Signs List | |
|---|---|
| 1 | Steel sheet for a can |
| 11 | Steel sheet |
| 12 | Ni—Cu alloy layer |
| 13A | Chromate film layer |
| 13B | Zr-containing film layer |

The invention claimed is:

1. A steel sheet for a beverage can exhibiting excellent corrosion resistance, adhesive property, and weldability, comprising:
   a steel sheet;
   an Ni—Cu alloy plating layer formed on at least one surface of the steel sheet; and
   a chromate film layer formed on a surface of the Ni—Cu alloy plating layer, wherein
   the Ni—Cu alloy plating layer has Ni attached thereto in an amount of from 0.30 g/m$^2$ to 3.0 g/m$^2$, and Cu contained therein in an amount of from 0.5 mass % to 3.8 mass %; and
   the chromate film layer has Cr attached thereto in an amount of from 1.0 mg/m$^2$ to 40 mg/m$^2$ in equivalent units of Cr.

2. A steel sheet for a beverage can exhibiting excellent corrosion resistance, adhesive properties, and weldability, comprising:
   a steel sheet;
   a Ni—Cu alloy plating layer formed on at least one surface of the steel sheet; and
   a Zr-containing film layer formed on a surface of the Ni—Cu alloy plating layer, wherein
   the Ni—Cu alloy plating layer has Ni attached thereto in an amount of from 0.30 g/m$^2$ to 3.0 g/m$^2$, and Cu contained therein in an amount of from 0.5 mass % to 2.2 mass %, and
   the Zr-containing film layer has Zr attached thereto in an amount of from 1.0 mg/m$^2$ to 40 mg/m$^2$ in equivalent units of Zr.

* * * * *